United States Patent [19]

Tsunashima et al.

[11] Patent Number: 4,911,539
[45] Date of Patent: Mar. 27, 1990

[54] MICRO ZOOM LENS

[75] Inventors: Teruyoshi Tsunashima, Tokyo; Kiyoshi Hayashi, Koganei; Atsushi Shibayama, Kawasaki, all of Japan

[73] Assignee: Nikon Corporation, Tokyo, Japan

[21] Appl. No.: 286,656

[22] Filed: Dec. 19, 1988

[30] Foreign Application Priority Data

Dec. 24, 1987 [JP] Japan .................. 62-327761
Jan. 25, 1988 [JP] Japan .................. 63-14227
Jan. 27, 1988 [JP] Japan .................. 63-16142
Feb. 8, 1988 [JP] Japan .................. 63-27130

[51] Int. Cl.⁴ ............................................. G02B 15/14
[52] U.S. Cl. .................................... 350/423; 350/450
[58] Field of Search ............... 350/423, 426, 427, 464, 350/450, 454, 458

[56] References Cited

U.S. PATENT DOCUMENTS 4,682,860 7/1987 Tanaka et al. .................. 350/426
4,838,669 6/1989 Ogata et al. .................... 350/427

FOREIGN PATENT DOCUMENTS 56-128911 10/1981 Japan .
60-170816 9/1985 Japan .

Primary Examiner—P. M. Dzierzynski
Attorney, Agent, or Firm—Shapiro and Shapiro

[57] ABSTRACT

A zoom lens comprises a first lens group having a positive refractive power and a second lens group having a negative refractive power sequentially from an object to be photographed. The first lens group comprises an aperture, a front group including at least two lens components having a positive refractive power, and a lens component which has a negative refractive power and an object-side lens surface of which has a concave surface directed toward an object side, and a rear group located nearer to an image than the aperture and including at least one lens component having a positive refractive power. The front group is located nearer to the object than the aperture and has a positive refractive power as a whole. The second lens group comprises at least one lens component having a positive refractive power and at least two lens components having a negative refractive power. A relative distance between the first and second lens groups is changed to perform zooming.

11 Claims, 3 Drawing Sheets

MICRO ZOOM LENS

BACKGROUND OF THE INVENTION

1. Field of the Invention

The present invention relates to a zoom lens and, more particularly, to a micro zoom lens suitably attached to a compact camera such as a lens shutter camera.

2. Related Background Art

The number of automatic functions of compact lens shutter cameras is increasing, and standard functions include an auto focus control, automatic film loading, a date photographing function, and a strobe function. These compact cameras are very popular among people in a wide range. In recent years, a compact lens shutter camera having a multifocal lens has been commercially available, and therefore, the range of users will be further widened.

Simplest zoom lenses suitable for compact cameras of this type are disclosed in Japanese Patent Laid-Open (Kokai) Nos. 56-128911 and 60-170816. Such a zoom lens is a two-group telephoto type zoom lens consisting of a first lens group having a positive refractive power and a second lens group having a negative refractive power. The telephoto type zoom lens does not require a long back-focal distance as compared with a lens for a single-lens reflex camera and is suitable for providing a compact camera by shortening the back-focal distance.

However, a typical conventional zoom lens of this type has a zoom ratio of 1.5 and a focal length f of about 40 to 60 mm, as disclosed in Japanese Patent Laid-Open (Kokai) No. 56-128911. Even a zoom lens having a high zoom ratio has a zoom ratio of 2 and a focal length f of 35 to 70 mm, as disclosed in Japanese Patent Laid-Open (Kokai) No. 60-170816.

In the above zoom lenses, a power (refractive power) of each lens group is weakened so as to assure imaging performance. Therefore, a displacement of each group for variable magnification is increased although the zoom ratio is not so high. As a result, the lens arrangement becomes undesirably bulky.

SUMMARY OF THE INVENTION

It is an object of the present invention to provide a micro zoom lens, wherein the conventional problems of two-group telephoto type zoom lenses can be solved, a compact, relatively simple arrangement having a short overall lens length can be achieved, a zoom ratio of 2 or more can be assured, and various types of aberration from a wide-angle end to a telephoto end are corrected.

A zoom lens according to the present invention comprises a first lens group G1 having a positive refractive power and a second lens group G2 having a negative refractive power sequentially from an object to be photographed, the first lens group G1 comprising an aperture, a front group GF including at least two lens components having a positive refractive power, and a lens component which has a negative refractive power and an object-side lens surface of which has a concave surface directed toward an object side, the front group being located nearer to the object than the aperture and having a positive refractive power as a whole, and a rear group GR located nearer to an image than the aperture and including at least one lens component having a positive refractive power, and the second lens group G2 comprising at least one lens component having a positive refractive power and at least two lens components having a negative refractive power, wherein a relative distance between the first and second lens groups G1 and G2 is changed to perform zooming.

With the above lens groups, the zoom lens of the present invention satisfies the following conditions:

$$0.45 < f1/fw < 0.9 \tag{1}$$

$$2.0 < fR/fF < 9.0 \tag{2}$$

$$-1.7 < R/fw < -0.4 \tag{3}$$

where fw is the focal length at the wide-angle end of the zoom lens, f1 is the focal length of the first lens group G1, fF is the focal length of the front group GF, fR is the focal length of the rear group GR, and R is the radius of curvature of the concave surface of the lens component of the front group GF which is located nearest to the object and concave toward the object.

With the above conditions, the refractive power of each group can be increased to shorten the overall length of the zoom lens. At the same time, various types of aberration which tend to be degraded can be corrected.

Since this zoom lens has a small overall length by minimizing a displacement of the first and second lens groups G1 and G2 for variable magnification, the first lens group G1 has a stronger positive refractive power. In addition, the positive refractive power of the first lens group G1 is shared by both the front and rear groups GF and GR. The type of aberration which generally tends to occur due to a high refractive power of a lens system can be effectively suppressed.

A positive field curvature of a meridional image plane (m image plane) occurs in the front group GF, while a negative field curvature occurs in the rear group GR. The negative field curvature in the rear group GR can be balanced with the positive image curvatures in the front group GF and the second lens group G2. Therefore, variation in image plane which is caused by variable magnification can be minimized.

Spherical aberration can be almost corrected by the front group GF. Even if only the front group GF of the first lens group G1 is extended to perform focusing, a variation in spherical aberration can be minimized. In this case, since the distance between the rear group GR of the first lens group G1 and the second lens group G2 is kept unchanged, a change in oblique beam incident on the second lens group G2 can be minimized by an in-focus state. Therefore, variations in the field curvature and distortion by a near-distance in-focus state can be minimized.

In order to obtain a small overall length of the zoom lens while correcting various types of aberration and distortion well, conditions (1) to (3) must be satisfied. The conditions will be described in detail below.

Condition (1) defines the refractive power of the first lens group G1. When a ratio exceeds an upper limit of condition (1), the refractive power of the first lens is weakened, and aberrational correction can be optimized. However, the overall length of the lens system is increased, and a displacement of each group during variable magnification is increased to result in a bulky lens system. Therefore, it is difficult to provide a compact lens. When the ratio is smaller than a lower limit of condition (1), compactness and a high magnification factor can be obtained. However, it is difficult to correct various types of aberration including spherical aberration.

Condition (2) is associated with aberrational variations during variable magnification. When a ratio is larger than an upper limit of condition (2), aberrational variations by the front group GF during variable magnification can hardly be corrected by the rear group GR. In addition, since the principal point of the first lens group G1 as a whole is displaced in the direction of the object, the rear group GR and the second lens group G2 mechanically interfere with each other at a telephoto end. When the ratio is smaller, than the lower limit of condition (2), the refraction power of the rear group GR is increased. The spherical aberration and chromatic aberration which occur in the rear group GR are increased, and it is therefore difficult to perform aberrational correction. In addition, since the refractive power of the front group GF is decreased, the lens diameter and the aperture size in the first lens group G1 are increased to fail to obtain a compact arrangement.

Condition (3) is associated with a concave surface of the lens component located nearest to the object. This concave surface is directed toward the object side within the front group GF. Condition (3) defines an optimal concave range for aberrational correction. When a ratio is smaller than a lower limit of condition (3), positive distortion occurring in the second lens group G2 cannot be satisfactorily corrected. When the ratio is larger than an upper limit of condition (3), coma occurring on the concave surface is greatly increased and can hardly be corrected.

According to the present invention as described above, there is provided a compact zoom lens wherein a compact arrangement is maintained with a simple structure, a zoom ratio of 2 or more can be assured in a wide variable magnification range, and good imaging performance with aberrational correction being effectively performed in a wide range from the wide-angle end to the telephoto end can be achieved.

The above and other objects, features, and effects of the present invention will be readily apparent from the following detailed description in conjunction with the accompanying drawings.

DESCRIPTION OF THE PREFERRED EMBODIMENTS

Preferred embodiments of the present invention will be described with reference to the accompanying drawings.

Figure 1:
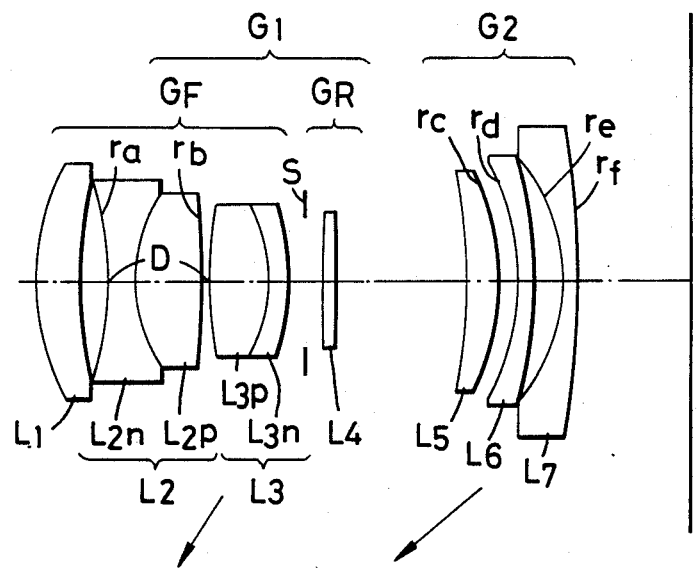
FIG. 1 is a sectional view showing an arrangement according to first to seventh embodiments of the present invention.

First to seventh embodiments are characterized in that a front group GF of a first lens group G1 having a positive refractive power has a simplest arrangement, as shown in FIG. 1.

A zoom lens shown in FIG. 1 comprises the first lens group G1 having a positive refractive power and a second lens group G2 having a negative refractive power. A distance between the first and second lens groups G1 and G2 is variably controlled to perform variable magnification. The first lens group G1 comprises an aperture, a front group GF located nearer to an object than the aperture and having a positive refractive power and a rear group GR located nearer to an image than the aperture and having a positive refractive power. More specifically, the front group GF of the first lens group G1 comprises a first lens component L1 having a positive refractive power, a second meniscus lens component L2 which has a negative refractive power and a concave surface of which is directed toward the object side, and a third lens component L3 having a positive refractive power. The rear group GR comprises a fourth lens component L4 having a positive refractive power. The second lens group G2 comprises a fifth lens component L5 of a positive meniscus lens whose convex surface is directed toward the image side, a sixth lens component L6 of a negative lens whose concave surface is directed toward the object side, and a seventh lens component L7 of a negative meniscus lens whose convex surface is directed toward the image side.

In the lens arrangement described above, the zoom lens satisfies conditions (1), (2), and (3), and preferably conditions (4), (5), and (6) below:

$$0.7 < |f2/f1| < 1.2 \tag{4}$$

$$1.5 < (rb+ra)/(rb-ra) < 13 \tag{5}$$

$$0.1 < D/fF < 0.4 \tag{6}$$

where f1 is the focal length of the first lens group G1, fR is the focal length of the rear group GR, f2 is the focal length of the second lens group G2, fw is the focal length of the entire system at the wide-angle end, ra is the radius R of curvature of the second lens component L2 on the object side, rb is the radius of curvature of the second lens component L2 on the image side, D is the sum of an air gap between the second and third lens components L2 and L3 and the thickness at the center of the second lens component L2, and fF is the focal length of the front group GF of the first lens group G1.

Japanese Patent Laid-Open (Kokai) No. 60-170816 also discloses a lens having a back-focal distance of 2 mm or less so as to excessively decrease the overall length of the lens. When the distance between the film surface to the lens last end face is excessively decreased, a ghost or the like which degrades image quality may be generated.

Condition (4) assures a reasonable back-focal distance to achieve compactness. When an absolute value exceeds an upper limit of condition (4), the refractive power of the second lens group G2 is lower than that of the first lens group G1, and a sufficient back-focal distance can be assured. However, the overall length of the variable magnification lens system is undesirably increased. However, when the absolute value is smaller than a lower limit of condition (4), the refractive power of the second lens group G2 can be increased. The back-focal distance can be shortened to advantageously obtain a compact structure. However, in this case, this arrangement is disadvantageous in aberrational correction. In particular, large positive distortion occurs at the wide-angle end and can hardly be corrected.

In the telephoto type zoom lens according to the present invention, large positive distortion generally occurs at the wide-angle end due to the following reason. Since the back-focal distance is short, the film surface is in proximity with the final lens surface of the second lens group G2 at the wide-angle end. An angle of an oblique beam output from the second lens group is extremely large. Distortion often accompanies a high-order curvature. An inverted U-shaped distortion distribution, which is most undesirable as a photographic lens, occurs. This distortion must be corrected.

In aberrational correction according to the above embodiments of the present invention, negative distortion intentionally generated by a lens component in the front group of the first lens group G1 which is separated from the aperture is used to cancel distortion generated in other groups, thereby performing overall aberrational correction. Correction of distortion is achieved by satisfying conditions (5) and (6).

Condition (5) defines the overall shape of the second lens component L2 in the first lens group G1. By this definition, the second lens component L2 has a meniscus shape whose convex surface is directed toward the image side. In particular, negative distortion is generated by the object-side concave surface of the second lens component L2 to perform good aberrational correction.

When a ratio exceeds an upper limit of condition (5), bending of the second lens component L2 toward the image is increased, and therefore the curvature of the second lens component L2 toward the object is excessively increased. Negative distortion excessively occurs, and unbalance occurs between this distortion and positive distortion generated by the second lens group G2. It is therefore difficult to correct distortion. In addition, asymmetrical components of coma are increased, and high-order field curvature occurs to result in failure of aberrational correction. When the ratio is smaller than a lower limit of condition (5), negative distortion rarely occurs. In this case, it is difficult to correct positive distortion generated by the second lens group G2.

In general, distortion is preferably corrected by a lens component separated from the aperture. Effective correction can be achieved when negative distortion is generated by the first lens group G1 at a position separated toward the object as much as possible. Condition (6) therefore defines an appropriate position of the second lens component L2.

When a ratio exceeds an upper limit of condition (6), the distance D between the object-side surface of the second lens component L2 and the object-side surface of the third lens component L3 is excessively large to advantageously correct distortion. However, a lens system becomes bulky, and positive field curvature also occurs. When the ratio is smaller than a lower limit of condition (6), negative distortion of the second lens component L2 on the object side rarely occurs, and appropriate correction cannot be performed unless the curvature of the second lens component L2 on the object side is increased. In the same manner as in the case wherein the ratio exceeds the upper limit of condition (5), both coma and high-order aberration of field curvature occur to result in failure of aberrational correction.

The zoom lens of the above embodiments preferably satisfies the following conditions:

$$0.5 < FL3/fF < 0.9 \tag{7}$$

$$3 < fR/f1 < 10 \tag{8}$$

where fR is the focal length of the rear group GR of the first lens group G1, and fL3 is the focal length of the third lens component L3.

Conditions (7) and (8) are suitably used to perform correction of spherical aberration and field curvature and correction of variations in field curvature by variable magnification. In addition, if "front-element focusing" which performs focusing upon movement of only the front group GF of the first lens group G1 is assumed, accurate correction of spherical aberration of the front group GF itself has been completed. This can be ensured by an arrangement which satisfies conditions (7) and (8).

Condition (7) is associated with accurate correction of spherical aberration. When a ratio exceeds an upper limit of condition (7), the refractive power of the third lens component L3 is decreased, and the positive refractive power shared by the first lens component L1 is increased. As a result, it is difficult to perform correction of distortion. When the ratio is smaller than a lower limit of condition (7), the refractive power of the third lens component L3 is excessively increased, high-order bending occurs in spherical aberration, and appropriate correction becomes difficult.

Condition (8) defines a ratio of refractive power components of the refractive power of the first lens group G1 which are shared by the front and rear groups GF and GR. In particular, generation of aberration in the front group GF is suppressed, and the rear group GR is located so as to interpose the aperture with the front group GF. A generation amount of field curvature in the front and rear groups GF and GR is controlled while balancing with field curvature in the second lens group G2. Variations in an in-focus state and during variable magnification are suppressed.

When a ratio exceeds an upper limit of condition (8), the refractive power of the rear group GR is undesirably decreased, and the front group GF is overloaded to result in a large negative field curvature value. Variations during variable magnification are excessively increased, resulting in inconvenience. When the ratio is smaller than a lower limit of condition (8), the refractive power of the rear group GR is excessively increased to cause high-order bending in spherical aberration. It is difficult to correct spherical aberration.

With the arrangement described above, the second lens component L2 of the front group GF of the first lens group G1 comprises a biconcave negative lens L2n and a biconvex positive lens L2p in an order from the object side. The lens L2p has a surface of a larger curvature directed toward the object side. The third lens component L3 comprises a composite lens of a biconvex positive lens L3p and a negative meniscus lens L3n. The order of the biconvex positive lens L3p and the negative meniscus lens L3n of the third lens component L3 may be reversed. Therefore, the direction of the bonding surface in the third lens component L3 may be convex on the object side or the image side.

The detailed lens arrangement described above preferably further satisfies the following conditions: If these conditions are satisfied, chromatic aberration can be appropriately corrected, and other aberrational correction functions can be provided. Therefore, optimal aberrational correction can be performed.

$$0.08 < NL2n - NL2p \quad (9)$$

$$0.1 < NL3n - NL3p \quad (10)$$

$$45 < \nu L1 < 62 \quad (11)$$

$$12 < \nu L3p - \nu L3n \quad (12)$$

$$6 > |rc - rd| \quad (13)$$

$$1.7 < NL7 \quad (14)$$

$$1.2 < (rf + re)/(rf - re) < 3.0 \quad (15)$$

where

NL2n: the refractive index of the negative lens L2n constituting the second lens component L2

NL2p: the refractive index of the positive lens L2p constituting the second lens component L2

NL3n: the refractive index of the negative lens L3n constituting the third lens component L3

NL3p: the refractive index of the positive lens L3p constituting the third lens component L3

νL1: the Abbe number of the first lens component L1

νL3n: the Abbe number of the negative lens L3n constituting the third lens component L3

νL3p: the Abbe number of the positive lens L3p constituting the third lens component L3 rc: the radius of curvature on the image side of the fifth lens component L5 rd: the radius of curvature on the object side of the sixth lens component L6

NL7: the refractive index of the seventh lens component L7 re: the radius of curvature on the object side of the seventh lens component L7 rf: the radius of curvature on the image side of the seventh lens component L7

Conditions (9) to (15) will be described in detail below.

Condition (9) gives a negative refractive power to a bonding surface of the second lens component L2 serving as an achromatic lens to intentionally generate negative distortion, so that conditions (5) and (6) can have an auxiliary correction function for distortion. Therefore, effective distortion correction can be performed without overloading an arrangement having a distortion correction function.

When a difference is smaller than a lower limit of condition (9), a refractive power for a reference ray (d-line) of the bonding surface is decreased, and a distortion correction effect cannot be expected. An upper limit of condition (9) is solely determined by existing glass materials.

Condition (10) is associated with correction of spherical aberration under condition (7), and more particularly, with a change in color of spherical aberration. Negative spherical aberration occurs in the third lens component L3 lens. In this case, by giving a negative refractive power to the bonding surface of the achromatic lens, negative spherical aberration inherently occurring in the positive lens can be corrected. Condition (10) contributes to correct large negative spherical aberration having a short wavelength. For this reason, it is more effective to form a concave bonding surface directed toward the object side.

Conditions (11) and (12) are used to effectively correct chromatic aberration. Since the second lens group G2 has a large positional difference in oblique beams at the wide-angle and telephoto ends, variations in chromatic difference of magnification by variable magnification occur but can be corrected by setting the Abbe number of the first lens component L1 to be an appropriate value. However, when variations in chromatic difference of magnification by variable magnification are completely corrected, variations in axial chromatic aberration are increased. As a result, it is difficult to correct chromatic aberration. The third lens component L3 serving as an achromatic lens is used to primarily correct axial chromatic aberration. An optimal range for selecting glass is given by condition (12). When a value is smaller than a lower limit of condition (11), variations in chromatic difference of magnification by variable magnification can be reduced, while variations in axial chromatic aberration are increased. It is therefore difficult to correct chromatic aberration. When a difference is smaller than a lower limit of condition (12), it is difficult to correct axial chromatic aberration which is left upon correction of the chromatic difference of magnification by the first lens component L1. An upper limit of condition (12) is solely determined by existing glass materials.

Condition (13) balances field curvature at the wide-angle end with spherical aberration to correct variations in field curvature by variable magnification. If $$0 < rc - rd < 6$$

a sum of field curvature values on the surface of the fifth lens component L5 on the image side and the surface of the sixth lens component L6 on the object side is negative with respect to an amount of generation of spherical aberration. When a difference in the above condition is large than 6, high-order bending also occurs. As a result, it is difficult to correct the field curvature. To the contrary, if $$-6 < rc - rd < 0$$

a field curvature value is positive with respect to spherical aberration. When the difference is smaller than −6, it is difficult to correct field curvature.

Conditions (14) and (15) are associated with correction of field curvature at the wide-angle end and particularly high-order bending. In the seventh lens component L7, high-order bending in field curvature occurs in a portion which is located at a farthest position from the optical axis and through which an oblique beam at a maximum view angle passes. When a value is smaller than a lower limit of condition (14), both surfaces must be ones having a small radius of curvature so as to obtain an equivalent refractive power. This tendency is enhanced, and finally it is difficult to correct field curvature. An upper limit of condition (14) is solely determined by existing glass materials. Condition (15) is used to give a shape for reducing an incident angle of an oblique beam on the seventh lens component L7 at the wide-angle range. When the ratio exceeds an upper limit, a curvature on the object side is increased, and high-order bending of field curvature is accelerated. However, when the ratio is smaller than a lower limit, large negative field curvature occurs, and it is difficult to correct field curvature.

The first to seventh embodiments of the present invention will be described below. Lenses of these embodiments are compact zoom lenses having a focal length of about 35 to 80 mm and an f-number of about 3.5 to 7.8.

The zoom lenses according to the first to seventh embodiments have the same lens arrangement as in the first embodiment of FIG. 1.

Specifications of the zoom lenses according to the first to seventh embodiments will be summarized below. Numerals in the leftmost column represent an order from the object side, reference symbol r denotes a radius of curvature of the lens surface; and d, a distance between lenses. The Abbe number and the refractive index n are values for the d-line ($\lambda=587.6$ nm).

TABLE 1
(FIRST EMBODIMENT)

|    | r        | d         | Abbe    | n       |
|----|----------|-----------|---------|---------|
| 1  | 18.000   | 3.30      | 58.5    | 1.65160 |
| 2  | 29.267   | 2.20      |         |         |
| 3  | −25.500  | 2.00      | 45.4    | 1.79668 |
| 4  | 9.905    | 5.80      | 41.5    | 1.57501 |
| 5  | −58.688  | .60       |         |         |
| 6  | 27.900   | 4.50      | 57.0    | 1.62280 |
| 7  | −11.991  | 1.70      | 23.0    | 1.86074 |
| 8  | −17.720  | 2.676     |         |         |
| 9  | 162.888  | 1.20      | 32.2    | 1.67270 |
| 10 | −162.888 | (VARIABLE)|         |         |
| 11 | −40.075  | 2.70      | 28.6    | 1.79504 |
| 12 | −16.369  | 1.70      |         |         |
| 13 | −15.785  | 1.20      | 33.9    | 1.80384 |
| 14 | −37.369  | 2.30      |         |         |
| 15 | −14.355  | 1.30      | 45.4    | 1.79668 |
| 16 | −67.702  | (VARIABLE)|         |         |

| f        | 35.9990 | 55.0001 | 78.7875 |
|----------|---------|---------|---------|
| d10      | 10.6909 | 4.7469  | 1.3469  |
| Bf       | 9.483   | 27.6806 | 50.460  |
| $f_1 =$  | 25.431  |         |         |
| $f_2 =$  | −24.355 |         |         |
| $f_F =$  | 31.863  |         |         |
| $f_R =$  | 121.250 |         |         |
| $F_{L3} =$ | 20.362 |         |         |

TABLE 2
(SECOND EMBODIMENT)

|    | r        | d         | Abbe    | n       |
|----|----------|-----------|---------|---------|
| 1  | 15.500   | 3.00      | 58.5    | 1.65160 |
| 2  | 19.047   | 2.50      |         |         |
| 3  | −24.067  | 1.50      | 45.4    | 1.79668 |
| 4  | 9.242    | 5.00      | 41.5    | 1.57501 |
| 5  | −42.500  | .60       |         |         |
| 6  | 27.000   | 5.40      | 55.6    | 1.69680 |
| 7  | −12.629  | 1.50      | 23.0    | 1.86074 |
| 8  | −19.699  | 2.660     |         |         |
| 9  | −50.000  | 1.20      | 32.2    | 1.67270 |
| 10 | −31.174  | (VARIABLE)|         |         |
| 11 | −28.100  | 2.70      | 28.6    | 1.79504 |
| 12 | −14.000  | 1.30      |         |         |
| 13 | −14.000  | 1.20      | 33.9    | 1.80384 |
| 14 | −25.240  | 2.50      |         |         |
| 15 | −12.929  | 1.30      | 45.4    | 1.79668 |
| 16 | −55.498  | (VARIABLE)|         |         |

| f        | 36.0388 | 53.9609 | 78.0008 |
|----------|---------|---------|---------|
| d10      | 10.3375 | 4.8675  | 1.4775  |
| Bf       | 10.499  | 28.380  | 52.364  |
| $f_1 =$  | 24.391  |         |         |

TABLE 2-continued
(SECOND EMBODIMENT)

| $f_2 =$    | −24.334 |
|------------|---------|
| $f_F =$    | 30.000  |
| $f_R =$    | 120.000 |
| $F_{L3} =$ | 18.689  |

TABLE 3
(THIRD EMBODIMENT)

|    | r        | d         | Abbe    | n       |
|----|----------|-----------|---------|---------|
| 1  | 18.383   | 2.60      | 60.3    | 1.62041 |
| 2  | 31.532   | 2.30      |         |         |
| 3  | −21.529  | 3.00      | 46.4    | 1.80411 |
| 4  | 12.819   | 4.00      | 45.9    | 1.54814 |
| 5  | −25.178  | 1.30      |         |         |
| 6  | 31.724   | 4.00      | 59.0    | 1.51823 |
| 7  | −11.500  | 1.00      | 27.6    | 1.75520 |
| 8  | −16.367  | 3.681     |         |         |
| 9  | −100.000 | 2.50      | 57.6    | 1.67025 |
| 10 | −45.539  | (VARIABLE)|         |         |
| 11 | −100.000 | 3.00      | 35.2    | 1.74950 |
| 12 | −17.438  | .50       |         |         |
| 13 | −20.581  | 1.20      | 46.4    | 1.80411 |
| 14 | −167.872 | 4.50      |         |         |
| 15 | −14.000  | 1.30      | 46.4    | 1.80411 |
| 16 | −60.141  | (VARIABLE)|         |         |

| f        | 36.0415 | 55.0027 | 78.8034 |
|----------|---------|---------|---------|
| d10      | 11.5398 | 5.2098  | 1.5758  |
| Bf       | 7.277   | 24.269  | 45.598  |
| $f_1 =$  | 27.175  |         |         |
| $f_2 =$  | −24.353 |         |         |
| $f_F =$  | 33.725  |         |         |
| $f_R =$  | 122.500 |         |         |
| $f_{L3} =$ | 24.474 |         |         |

TABLE 4
(FOURTH EMBODIMENT)

|    | r        | d         | Abbe    | n       |
|----|----------|-----------|---------|---------|
| 1  | 16.343   | 2.70      | 58.5    | 1.65160 |
| 2  | 30.263   | 1.80      |         |         |
| 3  | −18.779  | 1.65      | 44.7    | 1.80218 |
| 4  | 9.787    | 4.80      | 41.5    | 1.57501 |
| 5  | −30.259  | .50       |         |         |
| 6  | 27.754   | 3.70      | 60.3    | 1.62041 |
| 7  | −10.643  | 1.40      | 23.0    | 1.86074 |
| 8  | −15.594  | 3.852     |         |         |
| 9  | 134.506  | 1.00      | 42.0    | 1.66755 |
| 10 | −115.821 | (VARIABLE)|         |         |
| 11 | −45.760  | 1.50      | 28.6    | 1.79504 |
| 12 | −15.977  | 1.45      |         |         |
| 13 | −16.241  | .85       | 44.7    | 1.80218 |
| 14 | 778.318  | 3.50      |         |         |
| 15 | −10.384  | .90       | 45.4    | 1.79668 |
| 16 | −24.006  | (VARIABLE)|         |         |

| f        | 35.9998 | 53.9998 | 78.7987 |
|----------|---------|---------|---------|
| d10      | 5.9243  | 2.6187  | .5381   |
| Bf       | 10.860  | 25.431  | 45.506  |
| $f_1 =$  | 21.000  |         |         |
| $f_2 =$  | −17.000 |         |         |
| $f_F =$  | 26.310  |         |         |
| $f_R =$  | 93.376  |         |         |
| $f_{L3} =$ | 18.774 |         |         |

TABLE 5
(FIFTH EMBODIMENT)

|    | r        | d     | Abbe | n       |
|----|----------|-------|------|---------|
| 1  | 18.349   | 3.80  | 58.5 | 1.65160 |
| 2  | 32.866   | 2.40  |      |         |
| 3  | −32.102  | 2.35  | 45.4 | 1.79668 |
| 4  | 9.618    | 6.90  | 41.5 | 1.57501 |
| 5  | −110.913 | .70   |      |         |
| 6  | 36.971   | 4.00  | 58.5 | 1.65160 |
| 7  | −13.901  | 2.00  | 23.0 | 1.86074 |

TABLE 5-continued
(FIFTH EMBODIMENT)

| | | | | |
|---|---|---|---|---|
| 8 | −18.823 | 2.254 | | |
| 9 | 93.159 | 1.00 | 31.7 | 1.75692 |
| 10 | 163.432 | (VARIABLE) | | |
| 11 | −30.371 | 2.50 | 33.9 | 1.80384 |
| 12 | −17.423 | 1.80 | | |
| 13 | −18.902 | 1.20 | 33.9 | 1.80384 |
| 14 | −44.273 | 5.00 | | |
| 15 | −16.123 | 1.20 | 52.3 | 1.74810 |
| 16 | −41.624 | (VARIABLE) | | |

| f | 36.0000 | 54.0001 | 78.8000 |
|---|---|---|---|
| d10 | 15.4856 | 6.5967 | 1.0017 |
| Bf | 4.469 | 23.669 | 50.122 |
| $f_1 =$ | 30.000 | | |
| $f_2 =$ | −32.000 | | |
| $f_F =$ | 33.470 | | |
| $f_R =$ | 284.494 | | |
| $f_{L3} =$ | 21.350 | | |

TABLE 6
(SIXTH EMBODIMENT)

| | r | d | Abbe | n |
|---|---|---|---|---|
| 1 | 21.896 | 3.30 | 49.4 | 1.77279 |
| 2 | 38.542 | 2.20 | | |
| 3 | −23.833 | 1.50 | 40.9 | 1.79631 |
| 4 | 10.814 | 5.00 | 47.1 | 1.62374 |
| 5 | −82.253 | .60 | | |
| 6 | 36.707 | 4.00 | 42.0 | 1.66755 |
| 7 | −10.006 | 2.00 | 28.6 | 1.79504 |
| 8 | −19.117 | 2.201 | | |
| 9 | −286.558 | 1.20 | 57.6 | 1.67025 |
| 10 | −46.221 | (VARIABLE) | | |
| 11 | −41.753 | 3.00 | 28.6 | 1.79504 |
| 12 | −16.267 | .80 | | |
| 13 | −20.906 | 1.20 | 37.3 | 1.83400 |
| 14 | −79.583 | 3.50 | | |
| 15 | −12.240 | 1.30 | 37.3 | 1.83400 |
| 16 | −34.254 | (VARIABLE) | | |

| f | 35.9999 | 55.0046 | 78.7992 |
|---|---|---|---|
| d10 | 11.0915 | 5.1475 | 1.7475 |
| Bf | 8.823 | 27.021 | 49.807 |
| $f_1 =$ | 25.431 | | |
| $f_2 =$ | −24.353 | | |
| $f_F =$ | 35.949 | | |
| $f_R =$ | 82.058 | | |
| $f_{L3} =$ | 21.980 | | |

TABLE 7
(SEVENTH EMBODIMENT)

| | r | d | Abbe | n |
|---|---|---|---|---|
| 1 | 28.736 | 3.30 | 49.4 | 1.77279 |
| 2 | 54.611 | 2.00 | | |
| 3 | −26.717 | 4.00 | 40.9 | 1.79631 |
| 4 | 108.044 | 8.00 | 47.1 | 1.62374 |
| 5 | −111.993 | .10 | | |
| 6 | 36.746 | 4.00 | 42.0 | 1.66755 |
| 7 | −9.551 | 2.00 | 28.6 | 1.79504 |
| 8 | −24.926 | 1.489 | | |
| 9 | −286.558 | 1.20 | 47.1 | 1.67003 |
| 10 | −46.478 | (VARIABLE) | | |
| 11 | −40.380 | 3.00 | 28.6 | 1.79504 |
| 12 | −15.986 | .80 | | |
| 13 | −18.789 | 1.20 | 37.3 | 1.83400 |
| 14 | −44.492 | 3.50 | | |
| 15 | −12.981 | 1.30 | 37.3 | 1.83400 |
| 16 | −51.240 | (VARIABLE) | | |

| f | 35.9999 | 55.0045 | 78.7991 |
|---|---|---|---|
| d10 | 10.8394 | 4.8954 | 1.4954 |
| Bf | 9.240 | 27.439 | 50.225 |
| $f_1 =$ | 25.431 | | |
| $f_2 =$ | −24.353 | | |
| $f_F =$ | 35.949 | | |
| $f_R =$ | 82.631 | | |

TABLE 7-continued
(SEVENTH EMBODIMENT)

| $f_{L3} =$ | 28.000 |
|---|---|

Values corresponding to the above conditions according to the first to seventh embodiments of the present invention are summarized in Table A (Condition Corresponding Value Table).

TABLE A
(Condition corresponding Value Table)

| $\frac{f_R}{f_F}$ | $\frac{R}{f_w}$ | Embodiment | $\frac{f_1}{f_w}$ | $\left|\frac{f_2}{f_1}\right|$ | Q | $\frac{D}{f_F}$ | $\frac{f_{L3}}{f_F}$ | $\frac{f_R}{f_1}$ |
|---|---|---|---|---|---|---|---|---|
| 3.81 | −0.71 | 1 | 0.71 | 0.96 | 2.54 | 0.26 | 0.64 | 4.77 |
| 4.00 | −0.67 | 2 | 0.68 | 1.00 | 3.61 | 0.24 | 0.62 | 4.92 |
| 3.63 | −0.60 | 3 | 0.75 | 0.90 | 12.8 | 0.25 | 0.73 | 4.51 |
| 3.55 | −0.52 | 4 | 0.58 | 0.81 | 4.27 | 0.26 | 0.71 | 4.45 |
| 8.50 | −0.89 | 5 | 0.83 | 1.07 | 1.81 | 0.30 | 0.64 | 9.48 |
| 2.28 | −0.66 | 6 | 0.71 | 0.96 | 1.82 | 0.20 | 0.61 | 3.23 |
| 2.30 | −0.74 | 7 | 0.71 | 0.96 | 1.63 | 0.34 | 0.78 | 3.25 | for $Q = \dfrac{r_b + r_a}{r_b - r_a}$

| | $N_{L2n} - N_{L2p}$ | $N_{L3n} - N_{L3p}$ | $\nu L_1$ | $\nu L_{3p} - \nu L_{3n}$ |
|---|---|---|---|---|
| 1 | 0.22 | 0.24 | 58.5 | 34 |
| 2 | 0.22 | 0.16 | 58.5 | 32.6 |
| 3 | 0.26 | 0.24 | 60.3 | 31.4 |
| 4 | 0.23 | 0.24 | 58.5 | 37.3 |
| 5 | 0.22 | 0.21 | 58.5 | 35.5 |
| 6 | 0.17 | 0.13 | 49.4 | 13.4 |
| 7 | 0.17 | 0.13 | 49.4 | 13.4 |

| | $r_c - r_d$ | $NL_7$ | $r_f + r_e/r_f - r_e$ |
|---|---|---|---|
| 1 | −0.58 | 1.797 | 1.54 |
| 2 | 0 | 1.797 | 1.61 |
| 3 | 3.143 | 1.804 | 1.61 |
| 4 | 0.264 | 1.797 | 2.52 |
| 5 | 1.479 | 1.748 | 2.26 |
| 6 | 4.639 | 1.834 | 2.11 |
| 7 | 2.803 | 1.834 | 1.68 |

Figure 2:
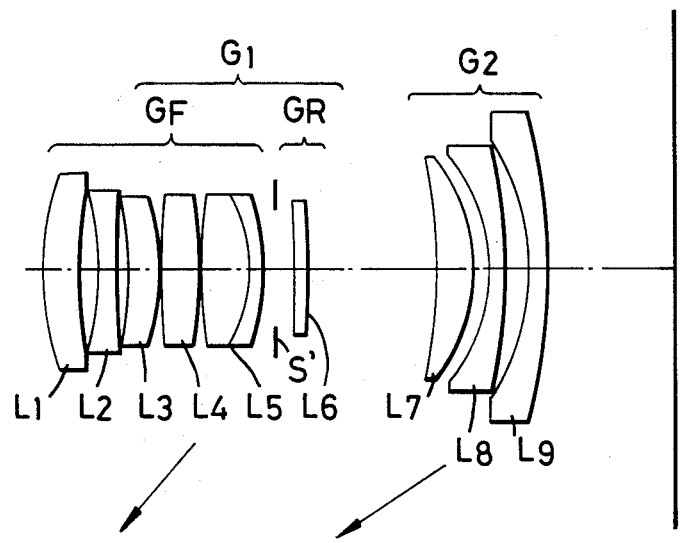
FIG. 2 is a sectional view showing an arrangement according to eighth to eleventh embodiments of the present invention.

FIG. 2 is a sectional view of an optical system according to eighth to eleventh embodiments of the present invention. Zoom lenses according to these embodiments are characterized in that two negative lens components L2 and L3 whose convex surfaces are directed toward the object side are arranged in a front group GF, as shown in FIG. 2.

The zoom lens shown in FIG. 2 comprises a first lens group G1 having a positive refractive power and a second lens group G2 having a negative refractive power in an order from the object in the same manner as in FIG. 1. A relative distance between the first and second lens groups G1 and G2 is changed to perform zooming.

The first lens group G1 comprises an aperture S, a front group GF having a positive refractive power and located nearer to the object than the aperture S and a rear group GR having a positive refractive power and located nearer to the image than the aperture S. The front group GF comprises a first lens component L1 having a meniscus shape having a convex surface directed toward the object side and a positive refractive power, a second lens group L2 having a concave surface directed toward the object side and having a negative refractive power, a third lens component L3 having a meniscus shape having a concave surface directed toward the object side and a negative refractive power, a fourth lens component L4 having a positive refractive power, and a fifth lens component L5 constituted by a combination of bonded lenses having refractive powers of different signs. The second lens group G2 comprises at least one positive lens component and at least two negative lens components.

With this arrangement, if the focal lengths of the first and second lens groups G1 and G2 are given as f1 and f2, respectively, the focal lengths of the front and rear groups GF and GR are given as fF and fR, respectively, the focal length of the zoom lens at a zoom position as the wide-angle end is given as fw, and the radius of curvature of the concave surface of the second lens component L2 on the object side is given as R, the zoom lens of these embodiments preferably satisfies conditions (1), (2), and (3) described above as well as the following condition:

$$-1.1 < f2/f1 < -0.8 \qquad (16)$$

In order to obtain a compact, low-cost telephoto type two-group zoom lens having the above arrangement, the number of lenses of the second lens group G2 is reduced and the negative lens component in the second lens group G2 is constituted by a single lens. Then, the second lens group G2 has a large negative refractive power and a large radius of curvature, and positive distortion and high-order aberration are increased accordingly. In particular, at the wide-angle side of the zoom lens, positive distortion, coma, and field curvature near the peripheral portion of the frame are increased. It is difficult to correct these types of aberration and distortion.

In order to correct aberration and distortion while a view angle of about 60° is maintained, at least two negative lens components are used in the second lens component to improve flexibility in aberrational correction.

The embodiments shown in FIG. 2 have arrangements which satisfy the above requirements. The arrangements have a high refractive power for achieving compactness and a high zoom ratio, while appropriately correcting positive distortion.

More specifically, in order to correct positive distortion generated by the second lens group G2, negative distortion must be generated by the first lens group G1. The object-side surface of the second lens component L2 in the first lens group G1 is constituted by a concave surface directed toward the object side, thereby intentionally generating negative distortion.

However, when negative distortion which can cancel positive distortion generated by the second lens group G2 is generated by only the second lens component L2, the surface of the second lens component L2 on the object side has an excessive curvature to increase high-order spherical aberration and coma accompanying therewith. It is therefore difficult to correct spherical aberration and coma.

In order to prevent the above drawback, a third lens component L3 having a negative focal length and a meniscus shape having a concave surface directed toward the object side is located nearer to the image side than the second lens component L2. The function for generating negative distortion is shared by the second and third lens components L2 and L3.

The second and third lens components L2 and L3 must have a shape for increasing positive spherical aberration.

For this reason, in order to appropriately correct this positive spherical aberration in a focal length range from the wide-angle end to the telephoto end, the first lens component L1 must have a shape for generating negative spherical aberration for canceling the above positive spherical aberration. At the same time, the first lens component L1 must also have a function for minimizing coma and astigmatism for a nonaxial oblique beam. For these reasons, the first lens component L1 must be constituted by a positive lens component having a meniscus shape whose convex surface is directed toward the object side.

When the first to third lens components L1 to L3 in the front group GF in the first lens group G1 in FIG. 2 are arranged as described above, distortion can be corrected to obtain a good balance, and spherical aberration, coma, and astigmatism can be minimized.

In order to converge beams passing through the first to third lens components L1 to L3 in the front group GF, a positive lens component having a high refractive power is required. In order to appropriately correct various types of aberration such as spherical aberration, two lens components, i.e., fourth and fifth lens components L4 and L5 having positive refractive powers are used to share this high positive refractive power.

In order to correct high-order spherical aberration, the fifth lens component L5 located nearest to the aperture and having a positive refractive power must have a negative refractive surface. The fifth lens component L5 is constituted by bonded two lenses having refractive powers of different signs, so that the bonding surface of the lenses has a negative refractive power.

Chromatic aberration is corrected as follows. The chromatic difference of magnification is primarily corrected by the first to third lens components L1 to L3 of the first lens group and the second lens group G1. Axial chromatic aberration is primarily corrected by the fourth and fifth lens components L4 and L5 in the first lens group G1. Since bonding of two lenses to constitute the fifth lens component L5 near the aperture S to correct chromatic aberration, the embodiments shown in FIG. 2 have an arrangement which is advantageous in correction of chromatic aberration.

In a telephoto type two-group zoom lens, a distance between the first and second lens groups G1 and G2 is greatly changed. In such a zoom lens, the chromatic difference of magnification and spherical aberration are greatly changed in accordance with variable magnification.

Variations in chromatic difference of magnification, spherical aberration, and axial chromatic aberration, which are caused by variable magnification, are minimized by the positive lens component in the second lens group G2.

The positive refractive power of the first lens group G1 is shared by components which interpose the aperture S therebetween. Generation of spherical aberration can be suppressed, while field curvature and coma which occur during variable magnification can be minimized. More specifically, the first lens group G1 is divided into the front and rear groups GF and GR having positive refractive powers and located to interpose the aperture S therebetween. Various aberrational components generated by the front and rear groups GF and GR during variable magnification can be canceled in a good balance, thereby minimizing the variations in various types of aberration.

In addition, in order to obtain a sufficient aberrational correction effect, a shape factor of the lens is defined as follows:

$$q = (r2 + r1)/(r2 - r1)$$

where r1 is the radius of curvature of the surface of the lens on the object side and r2 is the radius of curvature of the surface of the lens on the image side. The zoom lens is preferably arranged to satisfy the following conditions:

$$1.2 < qL1 < 3.5 \tag{17}$$

$$-0.5 < qL2 < 1.5 \tag{18}$$

$$2.7 < qL3 < 10.0 \tag{19}$$

where qL1 is the shape factor of the first lens component L1 having a positive refractive power and a meniscus shape whose convex surface is directed toward the object side, qL2 is the shape factor of the second lens component L2 having a negative refractive power and a concave surface directed toward the object side, and qL3 is the shape factor of the third lens component L3 having a negative refractive power and a meniscus shape whose concave surface is directed toward the object side. Conditions (16) to (19) will be described in detail below.

When the focal length f2 of the second lens group G2 is below a lower limit of condition (16), the overall length of the lens system is increased to fail to provide a compact zoom lens. However, when the focal length f2 exceeds an upper limit of condition (16), a Petzval's sum is negatively increased, and field curvature is undesirably increased. Therefore, an image plane cannot be made flat. In this case, positive distortion is also increased, and it is difficult to perform aberrational correction.

The second and third lens components L2 and L3 have a shape for generating large positive spherical aberration for correcting distortion. The first lens component L1 must have a shape for considerably generating large negative spherical aberration. Therefore, condition (17) defines an appropriate shape of the first lens component L1 about correction of spherical aberration. When a value exceeds an upper limit of condition (17), negative spherical aberration amount generated by the front group GF becomes excessive. However, when the value is below a lower limit of condition (17), a shortage of the negative spherical aberration amount generated by the front group GF occurs. In either case, it is difficult to correct spherical aberration by the entire lens system.

Condition (18) defines a shape of the second lens component L2 about correction of distortion, spherical aberration and coma. The second lens component L2 has a function for generating negative distortion while suppressing generation of coma. However, when a value exceeds an upper limit of condition (18), the curvature of the surface of the second lens component L2 on the object side is excessively increased, and high-order aberration typically occurs. It is difficult to correct spherical aberration and coma. To the contrary, when the value is below a lower limit of condition (18), a shortage of a negative distortion amount occurs. Therefore, it is difficult to correct positive distortion generated by the second lens group G2.

The third lens component L3 cooperates with the second lens component L2 to suppress generation of coma and generate negative distortion, so that the entire lens system can appropriately correct distortion. Condition (19) defines the shape of the third lens component L3 in order to correct distortion and coma. When the value exceeds an upper limit of condition (19), the curvature at the object side of the third lens component is increased too much, and coma and distortion are increased difficult to be corrected. However, when the value is below a lower limit of condition (19), the amount of generation of the negative distortion is reduced, and it is difficult to correct distortion of the overall lens system.

The following conditions must be satisfied to achieve better imaging performance.

$$\nu 2p < 35 \tag{20}$$

$$1.78 < n2n \tag{21}$$

where $\nu 2p$ is the Abbe number of the positive lens component L7 of the second lens group G2, and n2n is the average value of refractive indices of the negative lens components L8 and L9 of the second lens group G2 for a d-line ($\lambda = 587.6$ nm).

Condition (20) allows easy correction of the chromatic difference of magnification. In order to correct chromatic aberration of the second lens group G2, high dispersion glass must be selected for the positive lens component L7 of the second lens group G2, and low dispersion glass must be selected for the negative lens components L8 and L9 of the second lens group G2.

When a value exceeds an upper limit of condition (20), glass having a high refractive index cannot be used for the negative lens components L8 and L9 of the second lens group G2 due to limitations of the types of optical glass. As a result, it is difficult to correct distortion, coma, and field curvature.

In order to correct distortion, coma, and field curvature, the negative lens components L8 and L9 in the second lens group G2 preferably have a high refractive index, which is defined by condition (21). When the negative lens components L8 and L9 in the second lens group G2 has a higher refractive index, the curvature of the concave surface can be minimized. Generation of distortion and high-order aberration can be minimized to facilitate correction of various types of aberration. However, when the value exceeds a lower limit of condition (21), various types of aberration are increased and difficult to be corrected.

In the eighth to eleventh embodiments, compact zoom lenses have focal lengths of 36 to 78 mm, f-numbers of 3.6 to 7.8, and view angles of 60° to 31°.

The specifications of the eighth to eleventh embodiments are limited below. Numerical values in the leftmost column represent an order from the object side. Reference numeral r denotes a radius of curvature of the lens surface; d, a distance between the lenses; Abbe, an Abbe number; and n, a refractive index for a d-line ($\lambda = 587.6$ nm). Reference symbol FN denotes an f-number, and reference numeral 2ω denotes a view angle.

TABLE 8

(EIGHTH EMBODIMENT)
f = 36.0~78.0 FN = 3.6~7.8
2 ω = 60.7~31.1°

| r | d | Abbe | n |
| --- | --- | --- | --- |

TABLE 8-continued (EIGHTH EMBODIMENT)  
f = 36.0~78.0 FN = 3.6~7.8  
2 ω = 60.7~31.1°

| | | | | |
|---|---|---|---|---|
| 1 | 20.130 | 2.95 | 49.1 | 1.53172 |
| 2 | 52.627 | 1.10 | | |
| 3 | −28.096 | 1.50 | 46.4 | 1.80411 |
| 4 | 62.451 | 1.40 | | |
| 5 | −15.133 | 2.00 | 35.6 | 1.62588 |
| 6 | −22.829 | 0.20 | | |
| 7 | 65.465 | 3.00 | 35.2 | 1.74950 |
| 8 | −31.478 | 0.20 | | |
| 9 | 44.037 | 4.00 | 59.0 | 1.51823 |
| 10 | −10.414 | 1.00 | 23.0 | 1.86074 |
| 11 | −18.039 | 2.43 | | |
| 12 | −74.663 | 1.20 | 27.6 | 1.75520 |
| 13 | −41.220 | (VARIABLE) | | |
| 14 | −36.421 | 2.70 | 25.5 | 1.80458 |
| 15 | −14.559 | 1.66 | | |
| 16 | −12.447 | 1.20 | 37.3 | 1.83400 |
| 17 | −46.535 | 2.10 | | |
| 18 | −17.231 | 1.30 | 37.3 | 1.83400 |
| 19 | −42.651 | (Bf) | | |

| | | | |
|---|---|---|---|
| f | 36.0412 | 53.9658 | 78.0099 |
| d11 | 2.4315 | 2.4315 | 2.4315 |
| d13 | 10.3936 | 4.9236 | 1.5336 |
| Bf | 10.0418 | 27.9241 | 51.9116 |

TABLE 9

(NINTH EMBODIMENT)  
f = 36.0~78.0 FN = 3.6~7.8  
2 ω = 60.7~31.1°

| | r | d | Abbe | n |
|---|---|---|---|---|
| 1 | 20.990 | 2.95 | 49.7 | 1.55200 |
| 2 | 41.899 | 1.40 | | |
| 3 | −25.049 | 1.50 | 46.4 | 1.80411 |
| 4 | 163.217 | 1.20 | | |
| 5 | −15.937 | 2.00 | 39.2 | 1.62606 |
| 6 | −21.151 | 0.20 | | |
| 7 | 117.271 | 3.00 | 33.9 | 1.80384 |
| 8 | −40.288 | 0.20 | | |
| 9 | 38.442 | 4.00 | 59.0 | 1.51823 |
| 10 | −10.289 | 1.00 | 23.0 | 1.86074 |
| 11 | −17.190 | 2.56 | | |
| 12 | −87.498 | 1.20 | 27.6 | 1.75520 |
| 13 | −44.780 | (VARIABLE) | | |
| 14 | −39.678 | 2.70 | 28.6 | 1.79504 |
| 15 | −14.835 | 1.66 | | |
| 16 | −12.767 | 1.40 | 38.2 | 1.87800 |
| 17 | −46.252 | 1.90 | | |
| 18 | −17.230 | 1.30 | 46.4 | 1.80411 |
| 19 | −44.431 | (Bf) | | |

| | | | |
|---|---|---|---|
| f | 36.0401 | 53.9630 | 78.0039 |
| d11 | 2.5626 | 2.5626 | 2.5626 |
| d13 | 10.2852 | 4.8152 | 1.4252 |
| Bf | 10.0914 | 27.9725 | 51.9575 |

TABLE 10

(TENTH EMBODIMENT)  
f = 36.0~78.0 FN = 3.7~8.0  
2 ω = 60.4~31.1°

| | r | d | Abbe | n |
|---|---|---|---|---|
| 1 | 20.685 | 2.95 | 49.1 | 1.53172 |
| 2 | 62.622 | 1.10 | | |

TABLE 10-continued (TENTH EMBODIMENT)  
f = 36.0~78.0 FN = 3.7~8.0  
2 ω = 60.4~31.1°

| | | | | |
|---|---|---|---|---|
| 3 | −26.697 | 1.50 | 46.4 | 1.80411 |
| 4 | 68.274 | 1.40 | | |
| 5 | −14.823 | 2.00 | 35.6 | 1.62588 |
| 6 | −22.233 | 0.20 | | |
| 7 | 67.258 | 3.00 | 35.2 | 1.74950 |
| 8 | −31.589 | 0.20 | | |
| 9 | 38.089 | 4.00 | 59.0 | 1.51823 |
| 10 | −10.461 | 1.00 | 23.0 | 1.86074 |
| 11 | −17.771 | 1.00 | | |
| 12 | −80.057 | 1.20 | 27.6 | 1.75520 |
| 13 | −51.906 | (VARIABLE) | | |
| 14 | −36.421 | 2.70 | 25.5 | 1.80458 |
| 15 | −14.559 | 1.66 | | |
| 16 | −12.447 | 1.20 | 37.3 | 1.83400 |
| 17 | −46.535 | 2.10 | | |
| 18 | −17.231 | 1.30 | 37.3 | 1.83400 |
| 19 | −42.651 | (Bf) | | |

| | | | |
|---|---|---|---|
| f | 36.0411 | 53.9656 | 78.0098 |
| d11 | 1.0001 | 1.0001 | 1.0001 |
| d13 | 11.3003 | 5.8303 | 2.4403 |
| Bf | 10.0418 | 27.9240 | 51.9115 |

TABLE 11

(ELEVENTH EMBODIMENT)  
f = 36.3~78.0 FN = 3.6~7.7  
2 ω = 60.3~31.1°

| | r | d | Abbe | n |
|---|---|---|---|---|
| 1 | 16.467 | 2.95 | 49.1 | 1.53172 |
| 2 | 143.568 | 1.30 | | |
| 3 | −60.000 | 1.50 | 43.3 | 1.84042 |
| 4 | 25.691 | 1.60 | | |
| 5 | −13.297 | 2.00 | 35.6 | 1.62588 |
| 6 | −27.309 | 0.20 | | |
| 7 | 324.686 | 3.00 | 35.2 | 1.74950 |
| 8 | −27.406 | 0.20 | | |
| 9 | 30.719 | 4.00 | 54.6 | 1.51454 |
| 10 | −9.917 | 1.00 | 23.0 | 1.86074 |
| 11 | −16.255 | 1.63 | | |
| 12 | −181.309 | 1.20 | 23.0 | 1.86074 |
| 13 | −66.004 | (VARIABLE) | | |
| 14 | −33.624 | 2.70 | 25.5 | 1.80458 |
| 15 | −14.653 | 1.75 | | |
| 16 | −12.501 | 1.20 | 37.3 | 1.83400 |
| 17 | −49.501 | 2.10 | | |
| 18 | −17.095 | 1.30 | 37.3 | 1.83400 |
| 19 | −36.399 | (Bf) | | |

| | | | |
|---|---|---|---|
| f | 36.3423 | 53.9647 | 78.0075 |
| d11 | 1.6323 | 1.6323 | 1.6323 |
| d13 | 10.0500 | 4.7166 | 1.3266 |
| Bf | 10.0418 | 27.6230 | 51.6095 |

The condition corresponding values of the eighth to eleventh embodiments are summarized in Table B (Condition Corresponding Value Table) below.

TABLE B (CONDITION CORRESPONDING VALUE TABLE)

| Embodiment | $\frac{f_1}{f_w}$ | $\frac{f_2}{f_1}$ | $\frac{f_R}{f_F}$ | $\frac{R}{f_w}$ | $q_{L1}$ | $q_{L2}$ | $q_{L3}$ | $\nu_{2p}$ | $n_{2n}$ |
|---|---|---|---|---|---|---|---|---|---|
| 8 | 0.677 | −0.998 | 4.00 | −0.78 | 2.24 | 0.38 | 4.93 | 25.5 | 1.834 |
| 9 | 0.677 | −0.998 | 4.00 | −0.70 | 3.01 | 0.73 | 7.11 | 28.6 | 1.841 |
| 10 | 0.677 | −0.998 | 6.93 | −0.74 | 1.99 | 0.44 | 5.00 | 25.5 | 1.834 |
| 11 | 0.671 | −0.998 | 4.00 | −1.65 | 1.26 | −0.40 | 2.90 | 25.5 | 1.834 |

In each of the eighth to eleventh embodiments, in order to obtain a low-cost, compact zoom lens, the rear group GR is constituted by the sixth lens component L6 having a positive refractive power. The second lens group G2 comprises the seventh lens component L7 having a positive refractive power and a meniscus shape whose convex surface is directed toward the image side, the eighth and ninth lens components L8 and L9 each having a negative refractive power and a meniscus shape whose convex surface is directed toward the image side.

Figure 3:
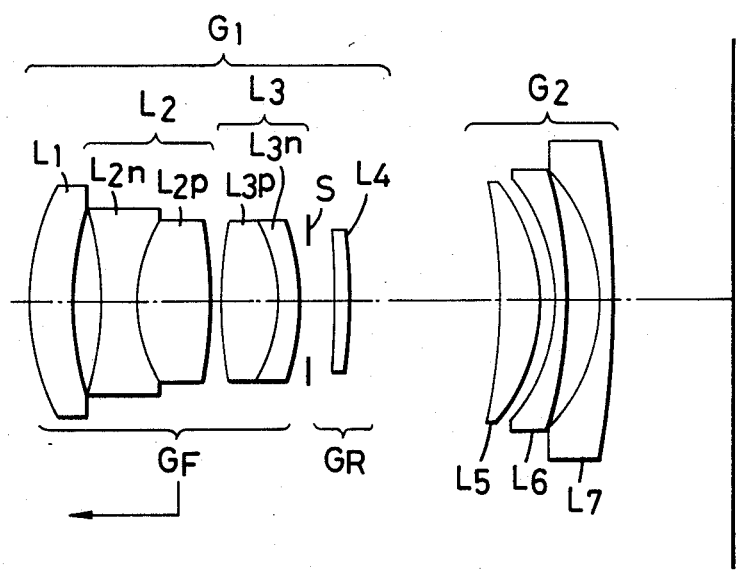
FIG. 3 is a sectional view showing an arrangement according to twelfth and thirteenth embodiments of the present invention.
Figure 4:
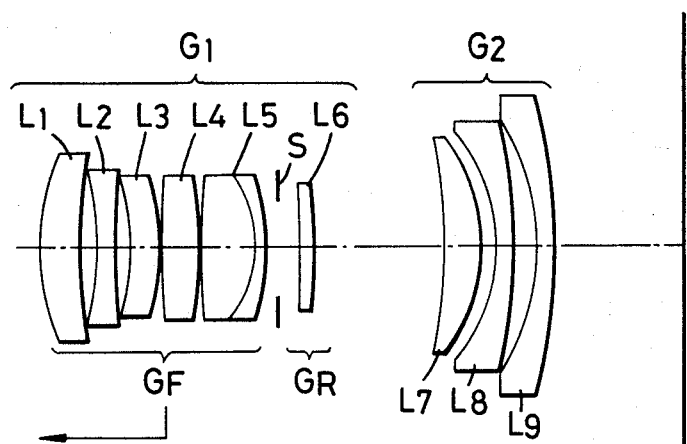
FIG. 4 is a sectional view showing an arrangement according to fourteenth to seventeenth embodiments of the present invention.
Figure 5A:
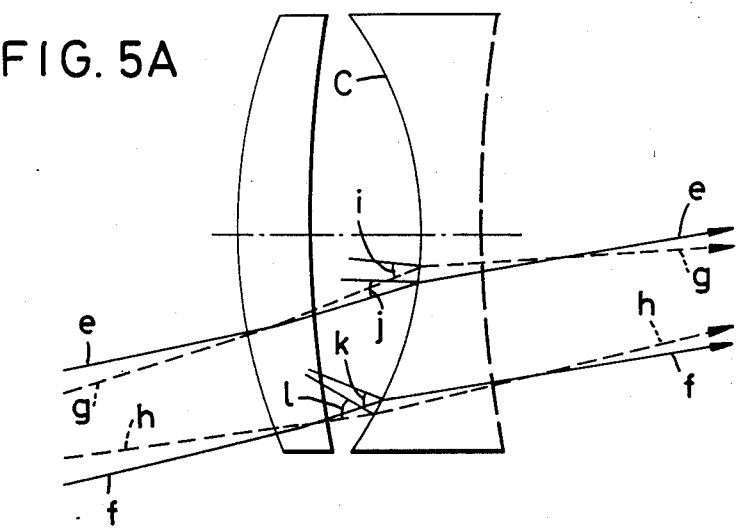
FIG. 5A is a view for explaining the principle of occurrence of aberration in a near-distance in-focus state of a focusing system in which a first lens group G1 is extended.

FIG. 3 is a sectional view showing an arrangement according to twelfth and thirteenth embodiments of the present invention, and FIG. 4 is a sectional view showing an arrangement according to fourteenth to seventeenth embodiments of the present invention. A zoom lens according to each of the twelfth to eighteenth embodiments is characterized in that a front group GF in a first lens group G1 is extended to perform focusing. FIG. 5A is a view for explaining the principle of generation of aberration in a near-distance in-focus state in a focusing system for performing focusing by extending the first lens group G1. The arrangement in FIG. 3 is substantially the same as that of FIG. 1, and the arrangement of FIG. 4 is substantially the same as that of FIG. 2.

The following three focusing systems of a conventional telephoto type two-group zoom lens are known:

(1) a focusing system in which an entire lens system is moved;

(2) a focusing system in which a second lens group having a negative refractive power is moved; and (3) a focusing system in which a first lens group having a positive refractive power is moved.

Lens displacement amounts for focusing of the lens systems at the wide-angle and telephoto ends are greatly different from each other in each of systems (1) and (2). A zoom lens focusing device such as an auto focus mechanism is inevitably complicated. Systems (1) and (2) are not suitable for a compact, low-cost camera.

System (3) is a focusing system generally employed in zoom lenses and has an advantage in that displacements from the wide-angle end to the telephoto end at the respective focal lengths can be almost equal to each other. A focusing device and especially the auto focus mechanism can be simplified, and a compact, low-cost camera can be obtained, as is known in Japanese Patent Laid-Open (Kokai) No. 60-170816 and the like.

In existing focusing systems of this type, in order to obtain a high zoom ratio and a compact arrangement, a first lens group must have a relatively large refractive power.

For this reason, tolerance for eccentricity or the like tends to be more strict, and there is fear of increasing the cost.

In a near-distance in-focus state on the wide-angle side, meridional curvature toward the object and coma occur, and imaging performance is greatly degraded. As a result, satisfactory image quality cannot be obtained.

Each of the embodiments shown in FIGS. 3 and 4 employs a new focusing system to solve the above problem. An appropriate near-distance in-focus state from the wide-angle end to the telephoto end can be provided, and a compact arrangement at low cost can be provided while a high zoom ratio is maintained.

A zoom lens of each of the embodiments shown in FIGS. 3 and 4 comprises a first lens group G1 having a positive refractive power and a second lens group G2 having a negative refractive power. A relative distance between the first and second lens groups G1 and G2 is changed to perform zooming.

The first lens group G1 comprises an aperture S, a front group GF having a positive refractive power and located nearer to the object than the aperture S, and a rear group GR having a positive refractive power and located nearer to the image than the aperture S. The front group GF comprises at least one lens component whose concave surface is directed toward the object side. Therefore, the front group GF is moved toward the object to perform focusing.

The zoom lens is arranged to satisfy the conditions as previously described:

$$0.45 < f1/fw < 0.9 \quad (1)$$

$$2.0 < fR/fF < 9.0 \quad (2)$$

$$-1.7 < R/fw < -0.4 \quad (3)$$

where fw is the focal length of the zoom lens at the wide-angle end, f1 is the focal length of the first lens group G1, fF is the focal length of the front group GF, fR is the focal length of the rear group GR, and R is the radius of curvature of the object-side lens component included in the front group GF and having a concave surface nearest to the object.

In a telephoto type zoom lens employing a focusing system in which the first lens group G1 is extended toward the object, the lens component in the first lens group G1 must have a concave lens surface directed toward the object side to generate negative distortion so as to correct positive distortion generated by the second lens group G2. The positive and negative components are balanced to correct distortion.

In the focusing system in which the first lens group G1 is extended toward the object, as shown in FIG. 5A, when near-distance focusing at the wide-angle end is performed, oblique beams g and h kept in the near-distance in-focus state and incident on a concave lens surface C of the first lens group G1 which is directed toward the object side and located nearest to the object side are diverged as compared with oblique beams e and f in an infinity in-focus state.

For this reason, an incident angle i of the upper oblique beam g of the near-distance in-focus state incident on the concave lens surface which is located nearest to the object side of the first lens group G1 and directed toward the object side is larger than an incident angle j of the upper oblique beam e in the infinity in-focus state. As a result, the upper oblique beam g in the near-distance in-focus state receives a refractive power to be bent downward as compared with the upper oblique beam e in the infinity in-focus state, thereby causing inward coma.

However, an incident angle l of the lower oblique beam h in the near-distance in-focus state is smaller than an incident angle k of the lower oblique beam f in the infinity in-focus state. As a result, the lower oblique beam in the near-distance in-focus state receives a refractive power for bending the beam upward as compared with the lower oblique beam f in the infinity in-focus state, thereby causing outward coma.

In the near-distance in-focus state, an image plane by a nonaxial meridional oblique beam is shifted in the negative direction, and the image plane is curved. This degradation of near-distance imaging typically occurs when a zoom lens is made compact and has a higher zoom ratio.

In the zoom lens of each of the embodiments shown in FIGS. 3 and 4, the front group GF in the first lens group G1 is extended to perform focusing. The same aberration as in FIG. 5A occurs. In order to prevent this in the zoom lens according to each of the embodiments shown in FIG. 3 and 4, the first lens group is divided into the front and rear groups GF and GR. A distance between the front and rear groups GF and GR is changed to perform focusing, thereby improving versatility of a power distribution.

In order to cancel the above aberration, the refractive power of the front group GF is decreased, and the front group GF is largely extended during an in-focus operation. Aberration which degrades imaging in the near-distance in-focus state can be appropriately corrected. The near-distance in-focus performance can be greatly improved, and compactness and a high zoom ratio can be obtained.

The principle of the new focusing system will be described below.

The refractive power of the front group GF in the arrangement shown in FIG. 3 or 4 is decreased to increase an extension amount of the front group GF in the in-focus state GF. When the front group GF is extended toward the object side in order to obtain an in-focus state, a meridional oblique beam m outside the axis and incident on the concave lens surface which is located nearest to the object and directed toward the object side is incident on the lens surface C as an oblique beam n having a higher incident height.

When the incident height of the nonaxial meridional oblique beam incident on the concave lens surface C is increased, an incident angle of the nonaxial meridional oblique beam incident on the concave lens surface C is increased. As a result, an effect for refracting the oblique beam downward is further increased.

When an extension amount of the front group GF is increased, the height of the nonaxial meridional oblique beam incident on the concave lens surface C is increased, and this oblique ray receives a higher refractive power at a peripheral portion of the concave lens surface C. As a result, the nonaxial meridional oblique beam is greatly refracted downward.

A lower ray of the nonaxial meridional oblique beam with respect to the principal ray as the central ray is greatly refracted downward to generate inward coma. However, an upper ray of the nonaxial meridional oblique beam is not greatly refracted downward with respect to the principal ray, and outward coma is generated. The nonaxial meridional image plane is shifted in the positive direction.

Figure 5B:
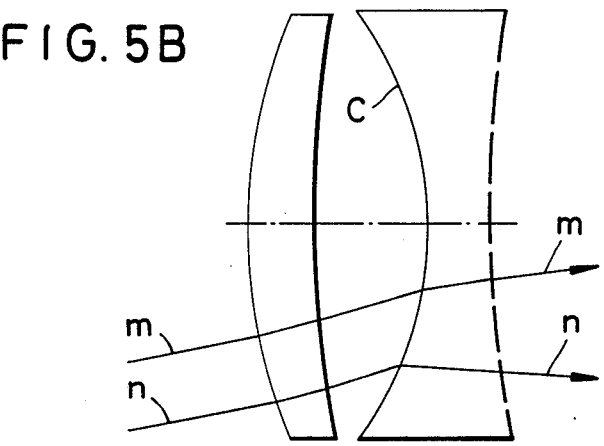
FIG. 5B is a view for explaining the principle of a focusing system according to the twelfth to eighteenth embodiments of the present invention.

In each of the embodiments shown in FIGS. 3 and 4, the above-mentioned various types of aberration described with reference to FIG. 5A is canceled by the various types of aberration described with reference to FIG. 5B. Aberrational variations at a near distance can be minimized. Variations in field curvature and coma can be mainly minimized. Therefore, excellent near-distance in-focus performance can be achieved.

Conditions (1), (2), and (3) will be described in more detail below. Conditions (1) and (2) define a focal length range of the first lens group G1 employed in the focusing system in the twelfth to seventeenth embodiments and a focal length range of the front and rear groups GF and GR, which effectively suppress aberrational variations in the near-distance in-focus state.

When a ratio exceeds an upper limit of condition (1), the refractive power of the first lens group G1 is decreased, and it it difficult to obtain a compact zoom lens having a high zoom ratio. Even if a system for extending the entire first lens group G1 is employed, a good in-focus state can be obtained. Therefore, a front-group (GF) extension focusing system need not be employed. If a focusing system for extending only the front group GF is employed, the displacement of the front group GF is excessively increased. Positive field curvature typically occurs in focusing at a near distance. When the ratio is below a lower limit of condition (1), it is advantageous to make the zoom lens compact and obtain a high zoom ratio. However, it is difficult to correct various types of aberration.

When a ratio exceeds an upper limit of condition (2), a displacement of the front group GF in the focusing system for extending the front group GF is not increased as compared with a system for extending the entire first lens group G1. For this reason, a front-group (GF) extension focusing effect cannot be enhanced. This effect is insufficient so that negative field curvature in the near-distance in-focus state undesirably occurs. However, when the ratio is below a lower limit of condition (2), in focusing by extending the front group GF, the displacement of the front group GF becomes too large, and the extending effect of the front group GF becomes excessive. Then, positive field curvature in the near-distance in-focus state undesirably occurs.

Regarding the concave surface of the lens component which is located nearest to the object side of the front group GF, condition (3) indicates an optimal concave shape range suitable for aberrational correction and the focusing system for extending the front group GF of the present invention.

When a ratio is below a lower limit of condition (3), negative distortion generated by this concave lens surface is decreased to fail to cancel positive distortion generated by the second lens group G2. When the ratio exceeds an upper limit of condition (3), coma generated by the concave lens surface is excessively increased, and aberrational correction is difficult to perform.

The compact zoom lenses according to the twelfth to seventeenth embodiments have focal lengths of about 36 to 78 mm, f-numbers of 3.6 to 7.8, and view angles of 60° to 30°.

The specifications of the zoom lenses according to the twelfth to seventeenth embodiments are summarized below. The numeric values in the leftmost column represent an order from the object side. Reference symbol r denotes a radius of curvature of the lens surface; d, a distance between the lens surfaces; Abbe, the Abbe number; and n, a refractive index for a d-line ($\lambda = 587$ nm). Reference symbol FN denotes an f-number. Reference numeral 2A denotes a view angle. Reference symbol D0 denotes a distance from the object to the first lens surface; and $\beta$, a near-distance photographing magnification.

TABLE 12

(TWELFTH EMBODIMENT)
f = 36.0~78.8 FN = 3.5~7.7
2A = 60.6~30.8°

| | r | d | Abbe | n |
|---|---|---|---|---|
| 1 | 18.000 | 3.30 | 57.0 | 1.62280 |
| 2 | 25.044 | 2.50 | | |
| 3 | −23.000 | 2.50 | 46.4 | 1.80411 |
| 4 | 10.907 | 6.00 | 41.5 | 1.57501 |
| 5 | −33.681 | 0.60 | | |
| 6 | 28.500 | 4.50 | 60.3 | 1.62041 |
| 7 | −12.423 | 1.50 | 23.0 | 1.86074 |
| 8 | −19.040 | 3.07 | | |
| 9 | −100.000 | 1.20 | 32.2 | 1.67270 |
| 10 | −45.140 | (VARIABLE) | | |
| 11 | −37.180 | 2.70 | 33.9 | 1.80384 |

TABLE 12-continued

(TWELFTH EMBODIMENT)
f = 36.0~78.8 FN = 3.5~7.7
2A = 60.6~30.8°

| | | | | |
|---|---|---|---|---|
| 12 | −15.677 | 1.70 | | |
| 13 | −14.306 | 1.20 | 46.4 | 1.80411 |
| 14 | −32.267 | 2.10 | | |
| 15 | −15.338 | 1.30 | 46.4 | 1.80411 |
| 16 | −83.568 | (Bf) | | |

| | | | |
|---|---|---|---|
| f | 35.9993 | 55.0008 | 78.7888 |
| D0 | ∞ | ∞ | ∞ |
| d8 | 3.0657 | 3.0657 | 3.0657 |
| d10 | 11.9578 | 6.0138 | 2.6138 |
| Bf | 9.4053 | 27.6025 | 50.3835 |
| β | −0.0682 | −0.1067 | −0.1589 |
| D0 | 542.5473 | 530.2483 | 510.7900 |
| d8 | 4.9895 | 5.0354 | 5.1127 |
| d10 | 11.9578 | 6.0138 | 2.6138 |
| Bf | 9.4054 | 27.6025 | 50.3835 |

TABLE 13

(THIRTEENTH EMBODIMENT)
f = 36.0~78.8 FN = 3.6~7.8
2A = 61.6~30.8°

| | r | d | Abbe | n |
|---|---|---|---|---|
| 1 | 20.743 | 3.30 | 57.0 | 1.62280 |
| 2 | 31.522 | 2.50 | | |
| 3 | −18.000 | 2.50 | 46.8 | 1.76684 |
| 4 | 14.722 | 6.00 | 60.8 | 1.56384 |
| 5 | −19.751 | 0.60 | | |
| 6 | 33.660 | 4.50 | 60.3 | 1.62041 |
| 7 | −20.547 | 1.50 | 23.0 | 1.86074 |
| 8 | −28.621 | 2.39 | | |
| 9 | −100.000 | 1.20 | 32.2 | 1.67270 |
| 10 | −45.140 | (VARIABLE) | | |
| 11 | −32.208 | 2.70 | 33.9 | 1.80384 |
| 12 | −15.919 | 1.80 | | |
| 13 | −15.418 | 1.20 | 44.7 | 1.80218 |
| 14 | −34.672 | 2.10 | | |
| 15 | −15.712 | 1.30 | 44.7 | 1.80218 |
| 16 | −75.859 | (Bf) | | |

| | | | |
|---|---|---|---|
| f | 35.9992 | 55.0006 | 78.7885 |
| D0 | ∞ | ∞ | ∞ |
| d8 | 2.3856 | 2.3856 | 2.3856 |
| d10 | 12.2785 | 6.3345 | 2.9345 |
| Bf | 9.0700 | 27.2671 | 50.0480 |
| β | −0.0682 | −0.1068 | −0.1589 |
| D0 | 543.1418 | 530.8428 | 511.3845 |
| d8 | 4.3103 | 4.3562 | 4.4336 |
| d10 | 12.2785 | 6.3345 | 2.9345 |
| Bf | 9.0700 | 27.2671 | 50.0480 |

TABLE 14

(FOURTEENTH EMBODIMENT)
f = 36.0~78.0 FN = 3.6~7.8
2A = 60.7~31.1°

| | r | d | Abbe | n |
|---|---|---|---|---|
| 1 | 20.800 | 2.95 | 49.1 | 1.53172 |
| 2 | 44.238 | 1.40 | | |
| 3 | −25.399 | 1.50 | 46.4 | 1.80411 |
| 4 | 135.109 | 1.20 | | |
| 5 | −15.682 | 2.00 | 38.1 | 1.60342 |
| 6 | −21.045 | 0.20 | | |
| 7 | 110.078 | 3.00 | 33.9 | 1.80384 |
| 8 | −40.019 | 0.20 | | |
| 9 | 38.982 | 4.00 | 59.0 | 1.51823 |
| 10 | −10.289 | 1.00 | 23.0 | 1.86074 |
| 11 | −17.201 | 2.56 | | |
| 12 | −87.498 | 1.20 | 27.6 | 1.75520 |
| 13 | −44.780 | (VARIABLE) | | |
| 14 | −39.678 | 2.70 | 28.6 | 1.79504 |
| 15 | −14.835 | 1.66 | | |
| 16 | −12.767 | 1.40 | 38.2 | 1.87800 |
| 17 | −46.252 | 1.90 | | |
| 18 | −17.230 | 1.30 | 46.4 | 1.80411 |

TABLE 14-continued

(FOURTEENTH EMBODIMENT)
f = 36.0~78.0 FN = 3.6~7.8
2A = 60.7~31.1°

| | | | | |
|---|---|---|---|---|
| 19 | −44.431 | (Bf) | | |

| | | | |
|---|---|---|---|
| f | 36.0406 | 53.9639 | 78.0057 |
| D0 | ∞ | ∞ | ∞ |
| d11 | 2.5618 | 2.5618 | 2.5618 |
| d13 | 10.2852 | 4.8152 | 1.4252 |
| Bf | 10.0917 | 27.9732 | 51.9588 |
| β | −0.0679 | −0.1041 | −0.1567 |
| D0 | 547.7513 | 535.2991 | 514.6314 |
| d11 | 4.2569 | 4.2976 | 4.3696 |
| d13 | 10.2852 | 4.8152 | 1.4252 |
| Bf | 10.0917 | 27.9732 | 51.9588 |

TABLE 15

(FIFTEENTH EMBODIMENT)
f = 36.0~78.0 FN = 3.6~7.8
2A = 60.8~31.1°

| | r | d | Abbe | n |
|---|---|---|---|---|
| 1 | 20.301 | 2.95 | 49.1 | 1.53172 |
| 2 | 60.911 | 1.30 | | |
| 3 | −29.322 | 1.50 | 46.4 | 1.80411 |
| 4 | 52.671 | 1.60 | | |
| 5 | −15.256 | 2.00 | 35.6 | 1.62588 |
| 6 | −22.604 | 0.20 | | |
| 7 | 66.896 | 3.00 | 35.2 | 1.74950 |
| 8 | −34.550 | 0.20 | | |
| 9 | 40.919 | 4.00 | 59.0 | 1.51823 |
| 10 | −10.351 | 1.00 | 23.0 | 1.86074 |
| 11 | −17.630 | 2.49 | | |
| 12 | −81.747 | 1.20 | 27.6 | 1.75520 |
| 13 | −43.250 | (VARIABLE) | | |
| 14 | −37.663 | 2.70 | 25.5 | 1.80458 |
| 15 | −14.682 | 1.66 | | |
| 16 | −12.526 | 1.20 | 37.3 | 1.83400 |
| 17 | −49.501 | 2.10 | | |
| 18 | −17.095 | 1.30 | 37.3 | 1.83400 |
| 19 | −41.160 | (Bf) | | |

| | | | |
|---|---|---|---|
| f | 36.0406 | 53.9643 | 78.0068 |
| D0 | ∞ | ∞ | ∞ |
| d11 | 2.4933 | 2.4933 | 2.4933 |
| d13 | 10.2962 | 4.8262 | 1.4362 |
| Bf | 10.0536 | 27.9353 | 51.9215 |
| β | −0.0679 | −0.1040 | −0.1566 |
| D0 | 547.5526 | 535.1002 | 514.4320 |
| d11 | 4.1878 | 4.2284 | 4.3005 |
| d13 | 10.2962 | 4.8262 | 1.4362 |
| Bf | 10.0536 | 27.9353 | 51.9215 |

TABLE 16

(SIXTEENTH EMBODIMENT)
f = 36.0~78.0 FN = 3.6~7.7
2A = 60.7~31.1°

| | r | d | Abbe | n |
|---|---|---|---|---|
| 1 | 18.483 | 2.95 | 49.1 | 1.53172 |
| 2 | 119.495 | 1.30 | | |
| 3 | −40.000 | 1.50 | 43.3 | 1.84042 |
| 4 | 33.159 | 1.60 | | |
| 5 | −13.902 | 2.00 | 35.6 | 1.62588 |
| 6 | −25.047 | 0.20 | | |
| 7 | 111.061 | 3.00 | 35.2 | 1.74950 |
| 8 | −28.930 | 0.20 | | |
| 9 | 34.537 | 4.00 | 54.6 | 1.51454 |
| 10 | −10.252 | 1.00 | 23.0 | 1.86074 |
| 11 | −17.055 | 2.18 | | |
| 12 | −116.105 | 1.20 | 27.6 | 1.75520 |
| 13 | −51.124 | (VARIABLE) | | |
| 14 | −36.708 | 2.70 | 25.5 | 1.80458 |
| 15 | −14.692 | 1.66 | | |
| 16 | −12.526 | 1.20 | 37.3 | 1.83400 |
| 17 | −49.501 | 2.10 | | |
| 18 | −17.095 | 1.30 | 37.3 | 1.83400 |
| 19 | −39.836 | (Bf) | | |

TABLE 16-continued (SIXTEENTH EMBODIMENT)
f = 36.0~78.0 FN = 3.6~7.7
2A = 60.7~31.1°

| f | 36.0407 | 53.9645 | 78.0071 |
|---|---|---|---|
| D0 | ∞ | ∞ | ∞ |
| d11 | 2.1834 | 2.1834 | 2.1834 |
| d13 | 10.1835 | 4.7135 | 1.3235 |
| Bf | 9.9546 | 27.8364 | 51.8227 |
| β | −0.0678 | −0.1039 | −0.1565 |
| D0 | 548.0759 | 535.6235 | 514.9553 |
| d11 | 3.8763 | 3.9169 | 3.9888 |
| d13 | 10.1835 | 4.7135 | 1.3235 |
| Bf | 9.9546 | 27.8364 | 51.8227 |

TABLE 17

(SEVENTEENTH EMBODIMENT)
f = 35.8~78.2 FN = 3.5~7.6
2A = 61.0~31.0°

| | r | d | Abbe | n |
|---|---|---|---|---|
| 1 | 16.527 | 2.95 | 64.1 | 1.51680 |
| 2 | 283.195 | 1.30 | | |
| 3 | −50.000 | 1.50 | 43.3 | 1.84042 |
| 4 | 28.531 | 1.60 | | |
| 5 | −13.141 | 2.00 | 35.6 | 1.62588 |
| 6 | −21.216 | 0.20 | | |
| 7 | 350.054 | 3.00 | 35.2 | 1.74950 |
| 8 | −37.132 | 0.20 | | |
| 9 | 35.426 | 4.00 | 45.9 | 1.54814 |
| 10 | −9.725 | 1.00 | 23.0 | 1.86074 |
| 11 | −16.307 | 1.71 | | |
| 12 | ∞ | 1.00 | 23.0 | 1.86074 |
| 13 | −86.074 | (VARIABLE) | | |
| 14 | −22.991 | 2.44 | 25.8 | 1.78472 |
| 15 | −15.257 | 3.37 | | |
| 16 | −12.788 | 1.08 | 37.3 | 1.83400 |
| 17 | −42.069 | 1.90 | | |
| 18 | −17.000 | 1.18 | 37.3 | 1.83400 |
| 19 | −30.154 | (Bf) | | |

| f | 35.7840 | 54.9856 | 78.2206 |
|---|---|---|---|
| D0 | ∞ | ∞ | ∞ |
| d11 | 1.7112 | 1.7112 | 1.7112 |
| d13 | 8.6687 | 3.6287 | 0.8387 |
| Bf | 9.3092 | 27.3038 | 49.0786 |
| β | −0.0671 | −0.1057 | −0.1561 |
| D0 | 549.9028 | 536.9059 | 517.8554 |
| d11 | 3.3994 | 3.4416 | 3.5074 |
| d13 | 8.6687 | 3.6287 | 0.8387 |
| Bf | 9.3092 | 27.3039 | 49.0786 |

Values corresponding to the conditions according to the twelfth to seventeenth embodiments of the present invention are summarized in Table C (Condition Corresponding Value Table).

TABLE C (CONDITION CORRESPONDING VALUE TABLE)

| Embodiment | $\frac{f_1}{f_w}$ | $\frac{f_R}{f_F}$ | $\frac{R}{f_w}$ |
|---|---|---|---|
| 12 | 0.706 | 3.81 | −0.64 |
| 13 | 0.706 | 3.81 | −0.50 |
| 14 | 0.678 | 4.00 | −0.71 |
| 15 | 0.678 | 4.00 | −0.81 |
| 16 | 0.678 | 4.00 | −1.11 |
| 17 | 0.656 | 3.33 | −1.40 |

In focusing in the twelfth and thirteenth embodiments, an air gap between the eighth and ninth surfaces of the lens is changed to extend the front group GF toward the object side.

In focusing in the fourteenth, fifteenth, sixteenth, and seventeenth embodiments, an air gap between the eleventh and twelfth surfaces of the lens is changed to extend the front group GF toward the object side.

What is claimed is:

1. A zoom lens comprising a first lens group having a positive refractive power and a second lens group having a negative refractive power in an order from an object side to relatively change a distance between said first and second lens groups, said first lens group comprising an aperture, a front group including at least two lens components having a positive refractive power, and at least one lens component having a negative refractive power and a concave surface directed toward the object side, said front group being located nearer to the object side than said aperture and having a positive refractive power as a whole, and a rear group located nearer to an image side than said aperture and including at least one lens component having a positive refractive power, and said second lens group comprising at least one lens component having a positive refractive power and at least two lens components having a negative refractive power, said zoom lens being arranged to satisfy the following conditions:

$0.45 < f1/fw < 0.9$ $2.0 < fR/fF < 9.0$ $-1.7 < R/fw < -0.4$ where f1 is a focal length of said first lens group, fw is a focal length of said zoom lens at a wide-angle end, fF is a focal length of said front group, fR is a focal length of said rear group, and R is a radius of curvature of an object-side lens element nearest to the object side of said front group and having a concave surface directed toward the object side.

2. A lens according to claim 1, wherein said front group of said first lens group is displaceable with respect to said rear group and said second lens group so as to perform focusing.

3. A lens according to claim 1, wherein said front group of said first lens group comprises a first lens component having a positive refractive power, a second lens component of a meniscus shape having a negative refractive power and a convex surface directed toward the image side, and a third lens component having a positive refractive power, said rear group of said first lens group comprises a fourth lens component having a positive refractive power, said second lens group comprises a fifth lens component of a meniscus shape having a positive refractive power and a convex surface directed toward the image side, a sixth lens component of a meniscus shape having a positive refractive power and a convex surface directed toward the image side, and a seventh lens component of a meniscus shape having a negative refractive power and a convex surface directed toward the image side, and said zoom lens satisfies the following conditions:

$0.7 < |f2/f1| < 1.2$ $1.5 < (rb+ra)/(rb-ra) < 13$ $0.1 < D/F < 0.4$ where f2 is a focal length of said second lens group, ra is a radius curvature of the object-side lens surface of said second lens component, rb is a radius of curvature of the image-side lens surface of said second lens component, and D is a sum of a central thickness of said second lens component and an air gap between said second lens component and said third lens component.

4. A lens according to claim 3, wherein said zoom lens satisfies the following conditions:

$$0.5 < fL3/fF < 0.9$$

$$3 < fR/f1 < 10$$

where fL3 is a focal length of said third lens component.

5. A lens according to claim 3, wherein said second lens component of said front group in said first lens group comprises a composite lens of a biconcave lens and a biconvex lens in an order from the object side, said biconvex lens having an object-side surface having a larger curvature, said third lens component comprises a composite lens of a biconvex lens and a negative meniscus lens, and said zoom lens satisfies the following conditions:

$$0.08 < NL2n - NL2p$$

$$0.1 < NL3n - NL3p$$

$$45 < \nu L1 < 62$$

$$12 < \nu L3p - \nu L3n$$

$$6 > |rc - rd|$$

$$1.7 < NL7$$

$$1.2 < (rf + re)/(rf - re) < 3.0$$

where
- NL2n: a refractive index of said negative lens constituting said second lens component
- NL2p: a refractive index of the positive lens constituting said second lens component
- NL3n: a refractive index of the negative lens constituting said third lens component
- NL3p: a refractive index of the positive lens constituting said third lens component
- NL7: a refractive index of said seventh lens component
- $\nu L1$: an Abbe number of said first lens component
- $\nu L3n$: an Abbe number of the negative lens constituting said third lens component
- $\nu L3p$: an Abbe number of the positive lens constituting said third lens component
- rc: a radius of curvature on the image side of said fifth lens component
- rd: a radius of curvature on the object side of the sixth lens component
- re: a radius of curvature on the object side of said seventh lens component
- rf: a radius of curvature on the image side of said seventh lens component.

6. A lens according to claim 1, wherein said front group of said first lens group comprises a first lens component of a meniscus shape having a positive refractive power and a convex surface directed toward the object side, a second lens component having a negative refractive power and a concave surface directed toward the object side, a third lens component having a negative refractive power and a meniscus shape having a concave surface directed toward the object side, a fourth lens component having a positive refractive power, and a fifth lens component having a positive refractive power and constituted as a composite lens of positive and negative lenses, said rear group of said first lens group comprises a sixth lens component having a positive refractive power, and said zoom lens satisfies the following condition:

$$-1.1 < f2/f1 < -0.8$$

where f2 is a focal length of said second lens group.

7. A lens according to claim 6, wherein assuming that a radius of curvature of an object-side surface of a given lens is given as r1, that a radius of curvature of an image-side surface of said given lens is given as r2, and that a shape factor q of said given lens is defined as:

$$q = (r2 + r1)/(r2 - r1)$$

if shape factors of said first, second, and third lens components are respectively given as qL1, qL2, and qL3, said zoom lens satisfies the following conditions:

$$1.2 < qL1 < 3.5$$

$$-0.5 < qL2 < 1.5$$

$$2.7 < qL3 < 10.0.$$

8. A lens according to claim 6, wherein if an Abbe number of the lens component of said second lens group which has a positive refractive power is given as $\nu 2p$, and an average value of refractive indices of the lens components of said second lens group which have the negative refractive power for a d-line ($\lambda = 587.6$ nm) is given as n2n, said zoom lens satisfies the following conditions:

$$\nu 2p < 35,$$

$$n2n > 1.78.$$

9. A zoom lens comprising a first lens group having a positive refractive power and a second lens group having a negative refractive power in an order from an object side to relatively change a distance between said first and second lens groups, said first lens comprising an aperture, a front group including at least two lens components each having a positive refractive power, and at least one lens component having a negative refractive power and a concave surface directed toward the object side, said front group being located nearer to the object side than said aperture, having a positive refractive power as a whole, and movable for focusing along an optical axis, and a rear group located nearer to an image side than said aperture and including at least one lens component having a positive refractive power, and said second lens group comprising at least one lens component having a positive refractive power and at least two lens components each having a negative refractive power.

10. A lens according to claim 9, wherein said front group of said first lens group comprises a first lens component of a meniscus shape having a positive refractive power and a convex surface directed toward the object side, a second lens component of a meniscus shape having a negative refractive power and a convex surface directed toward the image side, said second lens component being constituted by a composite lens of a biconcave lens and a biconvex lens, and a third lens component having a positive refractive power, said rear group comprises a fourth lens component having a positive refractive power, and said second lens group comprises a fifth lens component of a meniscus shape having a positive refractive power and a convex surface directed toward the image side, and sixth and seventh lens components of a meniscus shape each having a negative refractive power and a convex surface directed toward the image side.

11. A lens according to claim 9, wherein said front group of said first lens group comprises a first lens component of a meniscus shape having a positive refractive power and a convex surface directed toward the object side, a second lens component having a negative refractive power, a third lens component having a negative refractive power and a meniscus shape whose concave surface is directed toward the object side, a fourth lens component having a positive refractive power, and a fifth lens component constituted by a composite lens of positive and negative lenses and having a positive refractive power, and said rear group of said first lens group comprises at least one lens component having a positive refractive power.

* * * * *